US010450108B2

(12) United States Patent
Vaughan et al.

(10) Patent No.: US 10,450,108 B2
(45) Date of Patent: Oct. 22, 2019

(54) METHOD AND DEVICE FOR AUTOMATED EVACUATION OF PHARMACEUTICAL TUBES

(71) Applicant: UNIVERSITY OF LOUISIANA AT LAFAYETTE, Lafayette, LA (US)

(72) Inventors: Joshua Vaughan, Lafayette, LA (US); Seema Mallavalli, Lafayette, LA (US); Gerald Eaglin, Opelousas, LA (US); John Daigle, Lafayette, LA (US); Yasmeen Qudsi, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 15/331,018

(22) Filed: Oct. 21, 2016

(65) Prior Publication Data

US 2017/0113844 A1 Apr. 27, 2017

Related U.S. Application Data

(60) Provisional application No. 62/244,875, filed on Oct. 22, 2015.

(51) Int. Cl.

*B65D 35/28* (2006.01)
*A61J 1/16* (2006.01)
*B65B 3/12* (2006.01)
*B30B 3/02* (2006.01)
*G06F 3/0488* (2013.01)

(52) U.S. Cl.

CPC .............. *B65D 35/285* (2013.01); *A61J 1/16* (2013.01); *B30B 3/02* (2013.01); *B65B 3/12* (2013.01); *G06F 3/0488* (2013.01)

(58) Field of Classification Search

CPC . B65D 35/285; A61J 1/16; B30B 3/02; B65B 3/12
USPC ...................................... 222/1, 98, 101, 102
See application file for complete search history.

(56) References Cited

U.S. PATENT DOCUMENTS 2,690,858 A * 10/1954 Peralta ................ B65D 35/285 141/379
4,223,809 A * 9/1980 Martin .................. B65D 35/28 222/101

(Continued)

*Primary Examiner* — Vishal Pancholi
(74) *Attorney, Agent, or Firm* — Russel O. Primeaux; Jessica C. Engler; Kean Miller LLP

(57) ABSTRACT

In compounding pharmaceuticals at the outset, the medications are typically arrive in their mass produced form (pills, creams, syrups, etc.) and are individually packaged. Some packaging forms, particularly tubes, take an excessive amount of time to empty for the medication to be used in later compound medications. Presently in this industry, human workers will squeeze the medication out of each individual tube into large bucket containers for storage until the medication is ready for mixing. The disclosed invention provides a novel apparatus and method for emptying multiple tubes at a time with limited human interaction. The apparatus uses a roller and cap-pressing method that can empty several tubes at one time, significantly increasing efficiency. The apparatus is then connected with a novel software package which controls the operation of the device and can provide a counting mechanism for contract monitoring and predicting the lifespan of the device.

11 Claims, 6 Drawing Sheets

(56) References Cited

U.S. PATENT DOCUMENTS

| | | | | |
|---|---|---|---|---|
| 4,421,252 | A * | 12/1983 | Ylitalo ................. | B65D 35/285 222/102 |
| 5,845,813 | A * | 12/1998 | Werner ................ | B65D 35/285 222/101 |
| 6,401,977 | B1 * | 6/2002 | Ross, III .............. | B65D 35/285 222/100 |
| 6,659,309 | B2 * | 12/2003 | Friedman ............... | B65D 35/28 222/102 |
| 6,662,971 | B1 * | 12/2003 | Nguyen ............... | B65D 35/285 222/101 |
| 6,935,535 | B2 * | 8/2005 | Pandolfi ............. | A45D 26/0014 141/375 |
| 2003/0060925 | A1 * | 3/2003 | Bartholomew ........ | A45D 44/00 700/231 |
| 2008/0011775 | A1 * | 1/2008 | Arisman .................. | B44D 3/08 222/1 |

* cited by examiner

METHOD AND DEVICE FOR AUTOMATED EVACUATION OF PHARMACEUTICAL TUBES

CROSS REFERENCE TO RELATED APPLICATION

This application claims priority to the provisional U.S. patent application No. 62/244,875 entitled "Automated Evacuation of Pharmaceutical Tubes," filed Oct. 22, 2015.

STATEMENT REGARDING FEDERALLY SPONSORED RESEARCH OR DEVELOPMENT

Not applicable.

Reference to a "Sequence Listing," a Table, or a Computer Program

Not applicable.

DESCRIPTION OF THE DRAWINGS

The drawings constitute a part of this specification and include exemplary embodiments of the Method and Device for Automated Evacuation of Pharmaceutical Tubes, which may be embodied in various forms. It is to be understood that in some instances, various aspects of the invention may be shown exaggerated or enlarged to facilitate an understanding of the invention. Therefore, the drawings may not be to scale.

FIG. 2A specifically depicts the Graphical User Interface's Main screen, which controls the evacuation process and contains two buttons: one to start the process and one to stop the process. FIG. 2B displays the settings of the Graphical User Interface and allows the user to specify the number and type of tubes being evacuated, reset the local running count of tubes squeezed, and displays the lifetime running tube count.

FIG. 7 also depicts the emergency stop button 10 which can be used to shut off the system in an emergency.

BACKGROUND

Figure 1:
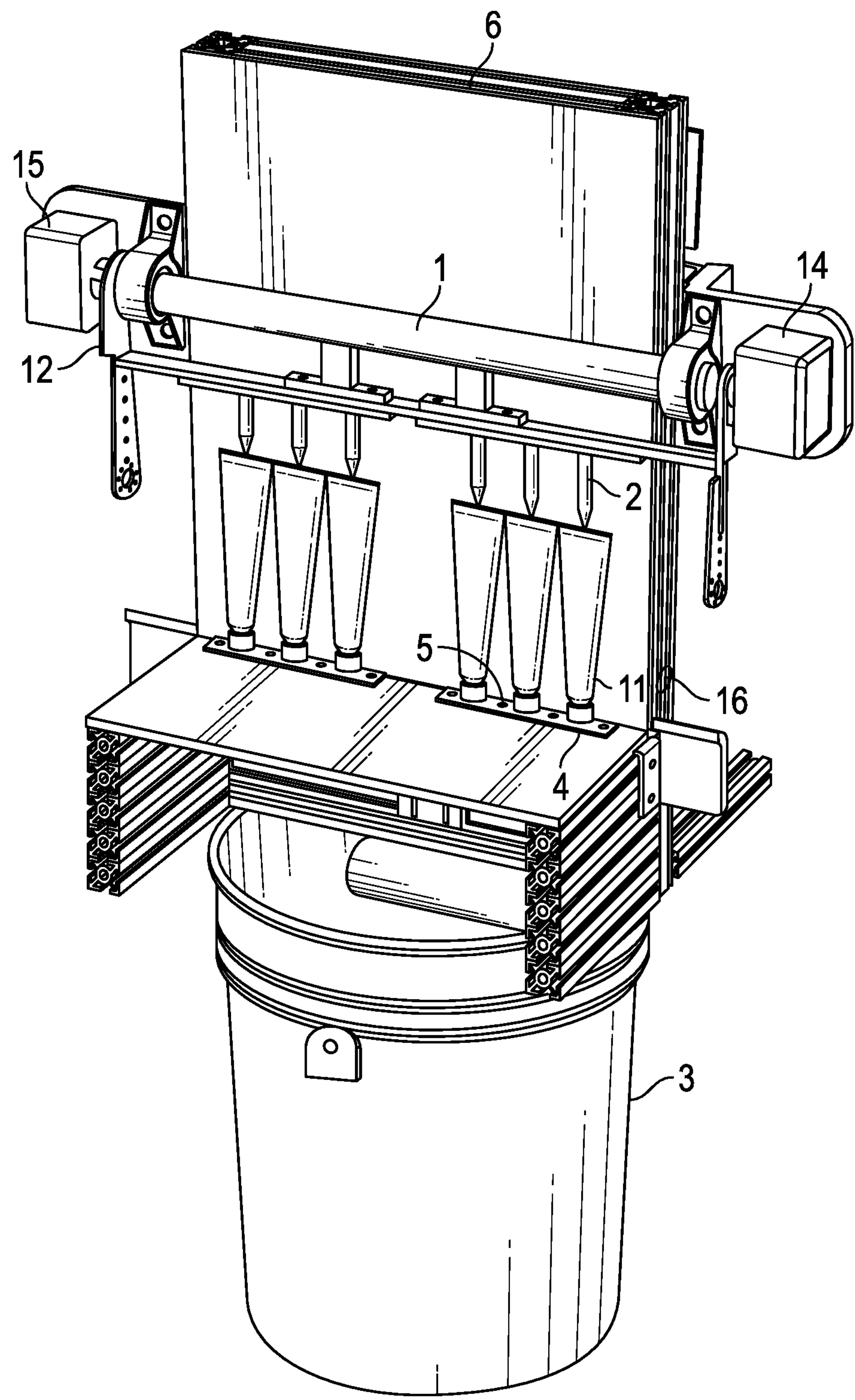
FIG. 1 depicts a CAD representation of an embodiment of the Method and Device for Automated Evacuation of Pharmaceutical Tubes which utilizes a roller 1 and pointy "cap-pushers" 2 to evacuate six pharmaceutical tubes 11 per process. This embodiment is configured to fit over a bucket 3.
Figure 2A:
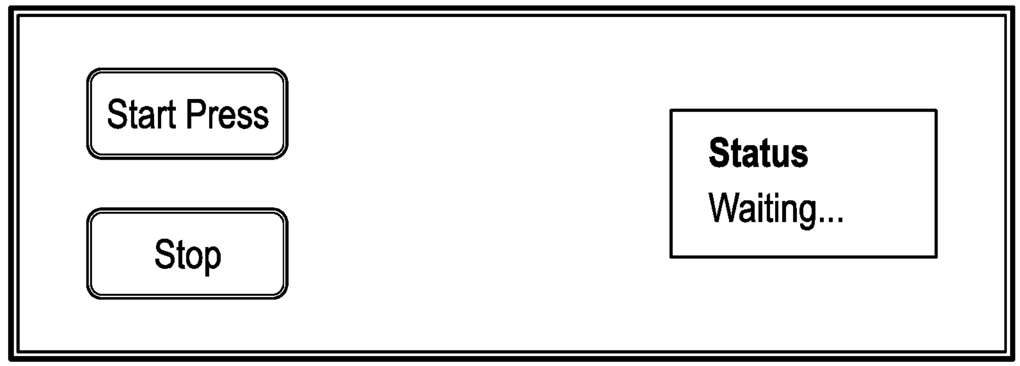
FIGS. 2A and 2B depicts the screens displayed as part of the Graphical User Interface, which is used to initiate the evacuation process and notify the user of the progress of the process.
Figure 2B:
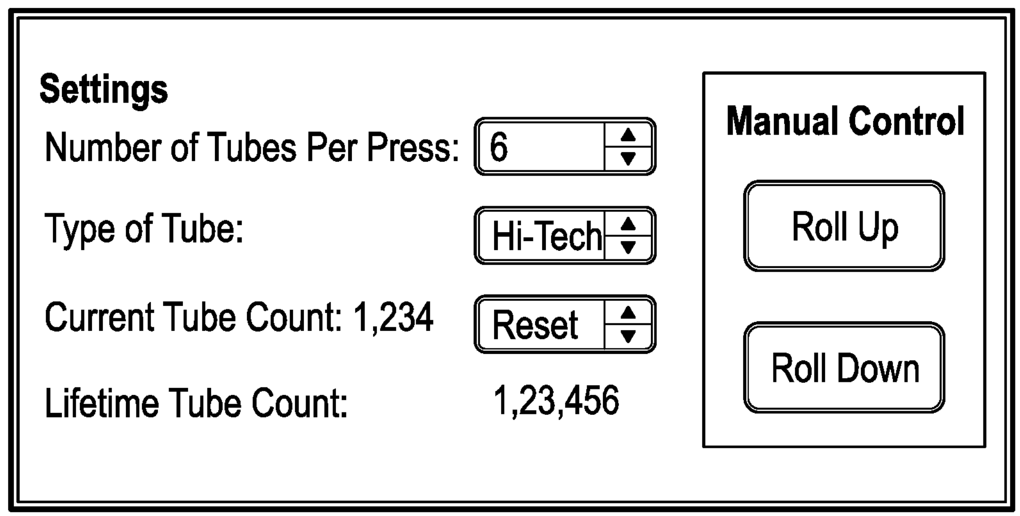

Pharmacy compounding is the art and science of preparing personalized medications for patients. Compounding creates pharmaceuticals to meet the unique needs of an individual patient when commercially available drugs do not meet those needs. For patients requiring customized medications, compounding medications are one of the few or only paths to better health.

Compounded medications are made based on a practitioner's prescription in which individual ingredients are mixed together in the exact strength and dosage form required by the patient. This method allows the compounding pharmacist to work with the patient and the treating physician to customize a medication to meet the patient's specific needs.

There are a number of different reasons why a compounding pharmacist may work with a doctor's prescription to create a customized medication. Compounding medication can be used to adjust the strength or dosage; flavor a medication to make more palatable for a child; reformulate a drug to exclude allergens; or change the form of medication for patients who have difficulty swallowing pills or capsules. Compounding pharmacists can put drugs into specially flavored liquids, topical creams, suppositories, or other dosage forms suitable for patient's unique needs. Specifically regarding creams, compounding for dermatological uses can often include the mixing of topical creams in order to meet a patient's skincare needs.

When mass-produced medications arrive to a pharmacy that performs compounding of medications, the medications are typically in their mass produced form (pills, creams, syrups, etc.) and are individually packaged. Some packaging forms, particularly tubes, take an excessive amount of time to empty for the medication to be used in later compound medications. Presently in this industry, human workers will squeeze the medication out of each individual tube into large bucket containers for storage until the medication is ready for mixing.

The compounding pharmaceutical industry has tried other solutions to quicken the emptying of tubes containing topical creams. One such process involved pulling the tube through a small slit in a paddle, followed by using a pair of pliers to squeeze the remaining contents from the cap-portion of the tube. Workers in the compounding pharmaceutical industry would repeat this process approximately 1000 times per day. This process, and other processes currently known in the art, is slow, inefficient, and tiresome.

SUMMARY OF THE INVENTION

The method and apparatus disclosed herein provides a novel and more efficient manner in which to empty pharmaceutical tubes that hold topic creams for later use in compounding medication. In this method and apparatus, a plurality of pharmaceutical tubes are emptied simultaneously by use of a mechanical roller that is used by all of the tubes being emptied. The rolling mechanism is shared among all the tubes being emptied. The rolling mechanism is powered by an actuator. By using actuation to power the tube evacuation, less physical labor is required from the pharmaceutical technician, allowing more tubes to be emptied in less time.

DESCRIPTION OF THE INVENTION

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies.

Furthermore, the described features, structures, or characteristics may be combined in any suitable manner into one or more embodiments.

The disclosed invention is a novel, efficient solution to efficiently empty multiple pharmaceutical tubes at one time. The inventive solution uses one or more rollers along with an optional "cap-pusher" mechanism. The roller size and number can be adjusted based on the type and number of tubes to be evacuated per press, and the "cap-pusher" shape can be similarly adjusted. However, in the preferred embodiment, the yield of the tubes to be evacuated is such that only the rollers are needed. In addition, the design allows the width to be adjusted with very little other changes. This can facilitate use in larger facilities, which may evacuate a larger number of tubes each day.

This application discloses a novel embodiment of the invention that is comprised of a roller 1 and pointy "cap-pushers" 2 to evacuate multiple tubes 11 per process, as depicted in FIG. 1. The cap-pushers 2 are located on the pusher bar 12 which is free to rotate into the particular position needed for the application. In the preferred embodiment, shown in FIG. 1, a one-inch roller is used with six cap-pushers to empty six pharmaceutical tubes in one operation cycle. This embodiment is designed to fit over a large bucket 3. In the preferred embodiment, the tubes 11 are placed in individual holders 4, with the open cap-side of the tube facing downward. Each holder for each tube contains a hole 5 inside of it so that the contents of the tube can pass through the holder 4 and into the bucket 3 below. The system begins in the start position, with the "cap-pusher" mechanism, comprised of the cap-pushers 2 and the pusher bar 12, raised above the roller 1 in an upright position. The roller system and the tubes all rest against the flat back-piece 6 of the device. The roller 1 is then actuated down the tubes, using the pusher system rotation actuators 14 and 15, pressing the tubes 11 between the flat back-piece 6 and the roller 1, evacuating most of their contents. After the roller 1 is moved back up to its neutral configuration, using the pusher system rotation actuators 14 and 15, the pusher bar 12 is moved into the downward position, and the cap-pushers 2 are consequently pointed in the downward position to push the caps. Then, the system is again actuated down, evacuating the remaining contents that were held in the cap of the tubes. After the tube caps are evacuated, the device returns to the top limit, the default, home location, and the system rotates the pusher bar 12 and cap-pushers 2 back into the upward default position. Pusher system rotation actuators 14 and 15 and the resulting emptying function are powered using a motor 13 which is located on the flat back-piece 6 and is connected to the actuators using known wiring techniques. In the preferred embodiment, the position is sensed via a proximity sensor 16. The proximity sensor can be placed in numerous locations on the flat back-piece 6. If there were no errors during the process, the evacuation is written to a database. If errors occurred or the process was otherwise stopped, this information is also recorded into a database.

Figure 3:
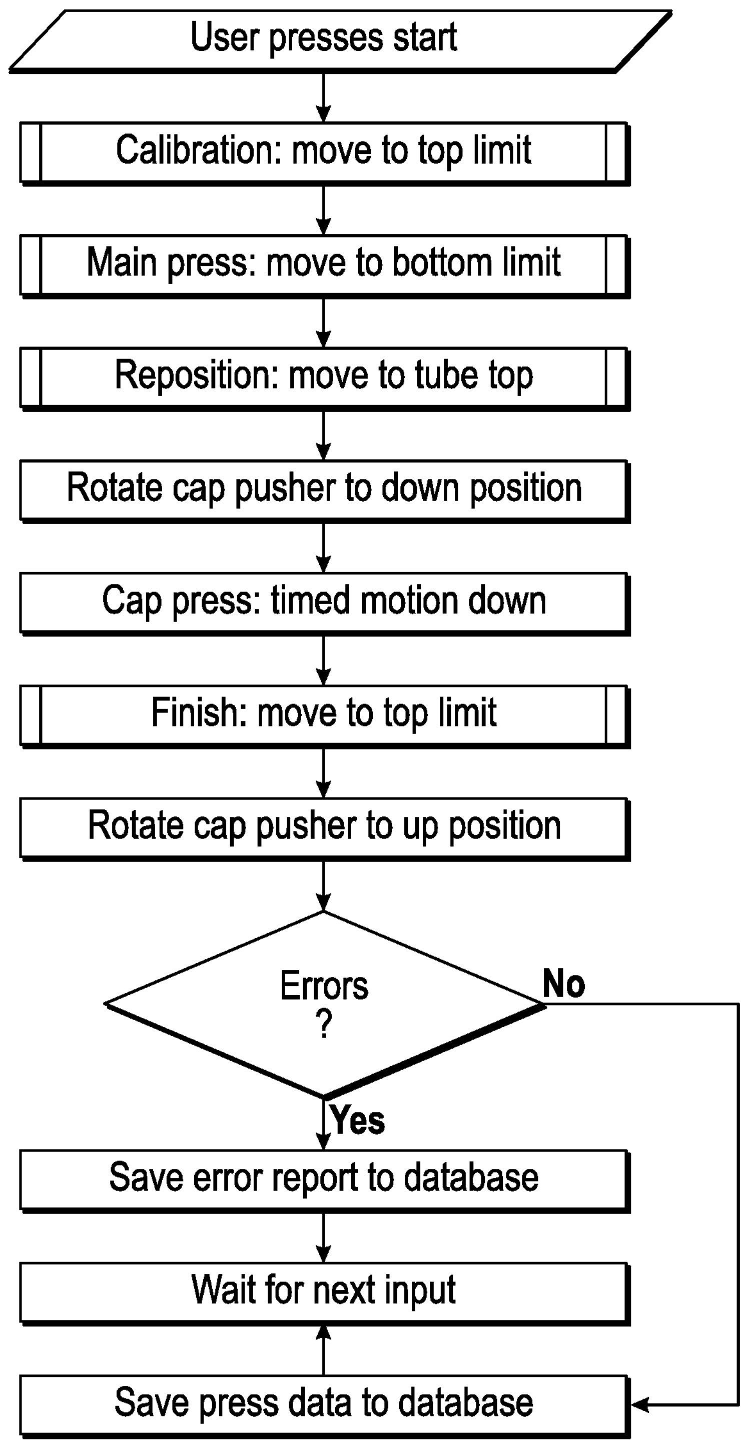
FIG. 3 depicts a high-level overview of the steps taken in implementing the method for using the device and process used by the Method and Device for Automated Evacuation of Pharmaceutical Tubes.
Figure 4:
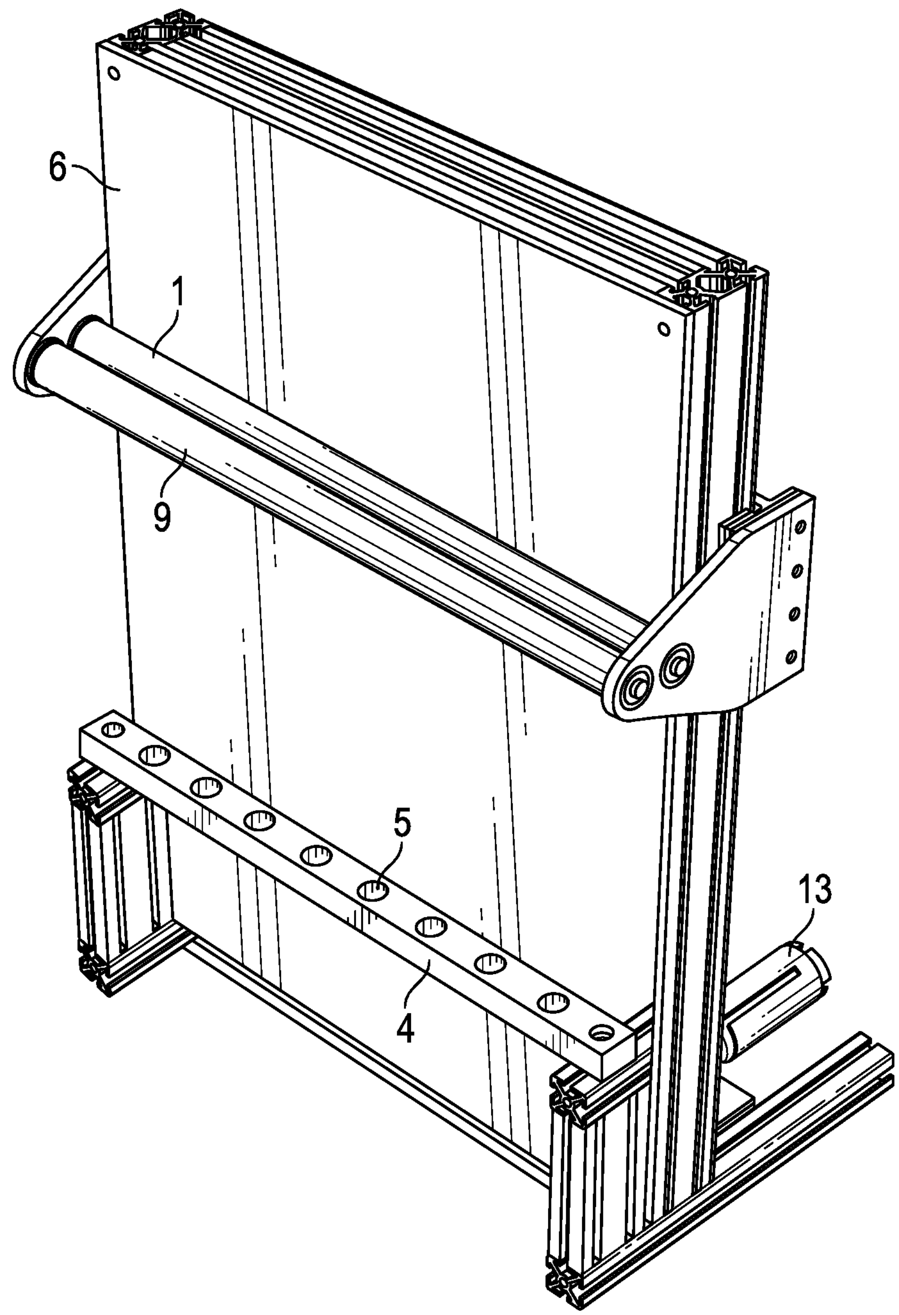
FIG. 4 depicts the Method and Device for Automated Evacuation of Pharmaceutical Tubes using an additional roller 9 instead of the single roller and cap-pusher.
Figure 5:
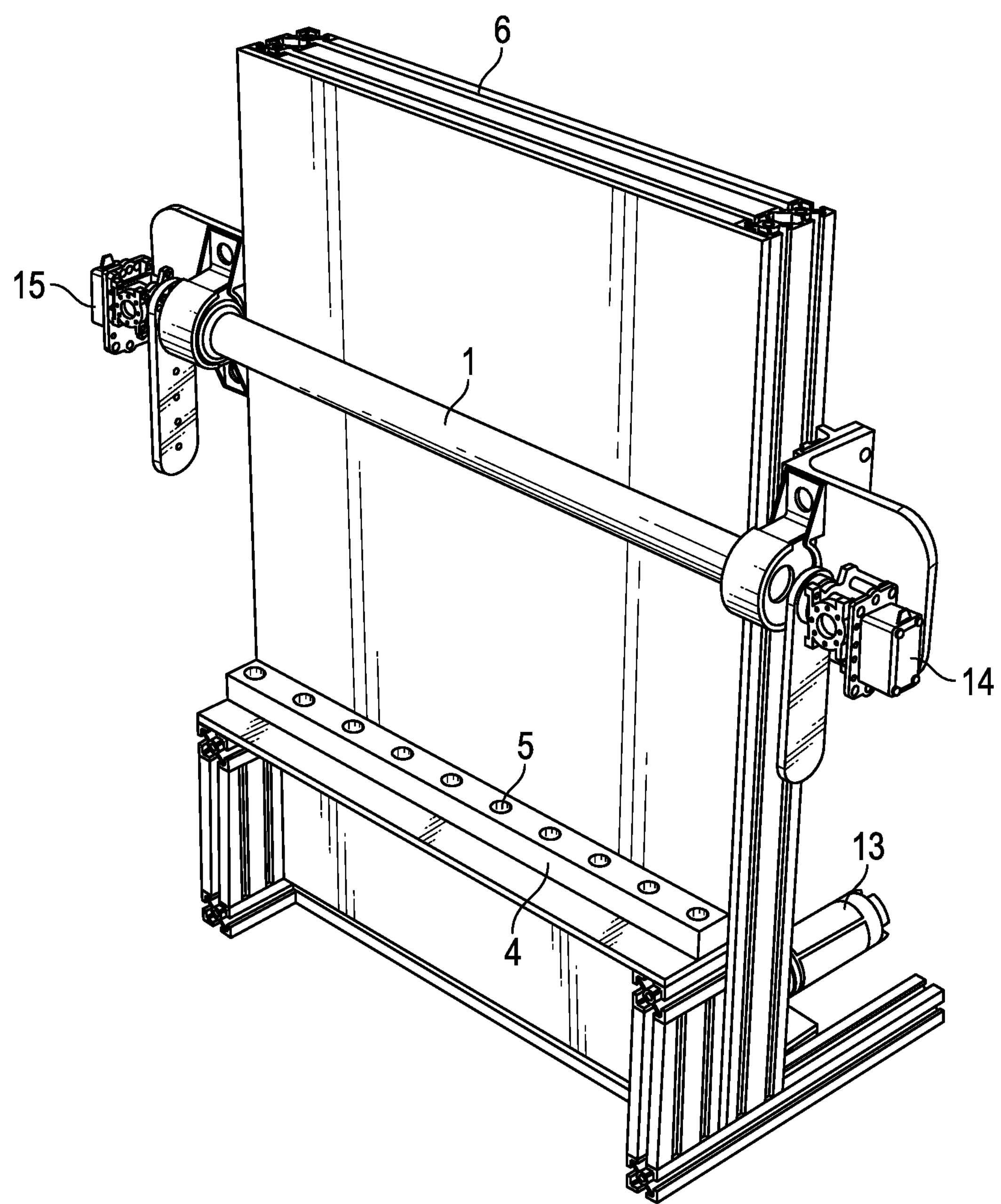
FIG. 5 depicts the Method and Device for Automated Evacuation of Pharmaceutical Tubes using one roller 1 without the pusher bar 12.
Figure 6:
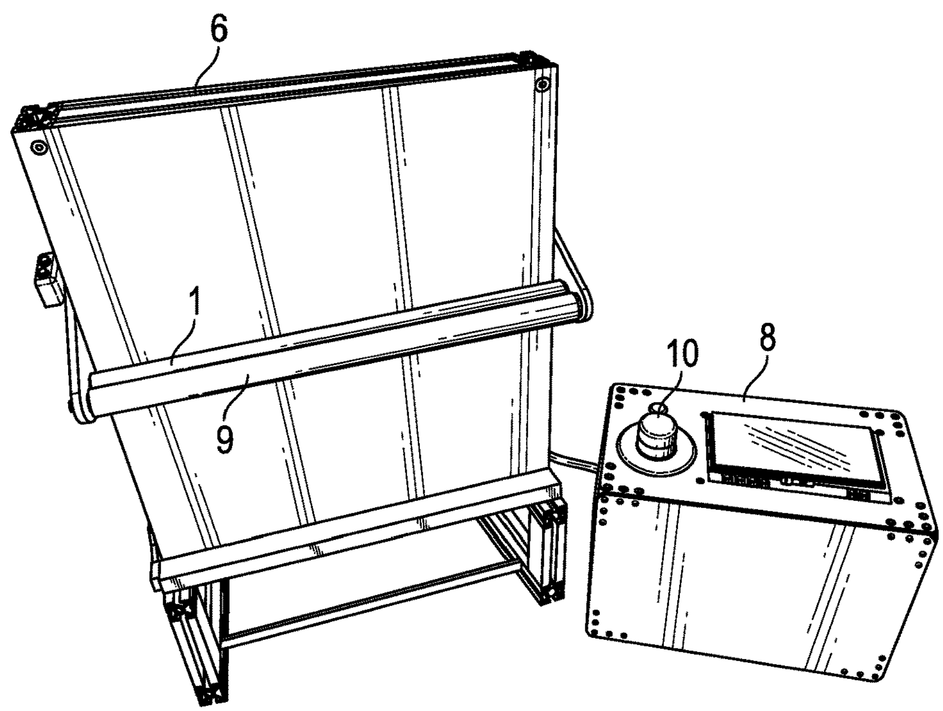
FIG. 6 depicts the disclosed system with the Graphical User Interface system, which are connected using known wiring techniques so that the Graphical User Interface System 8 can control the device's operation.
Figure 7:
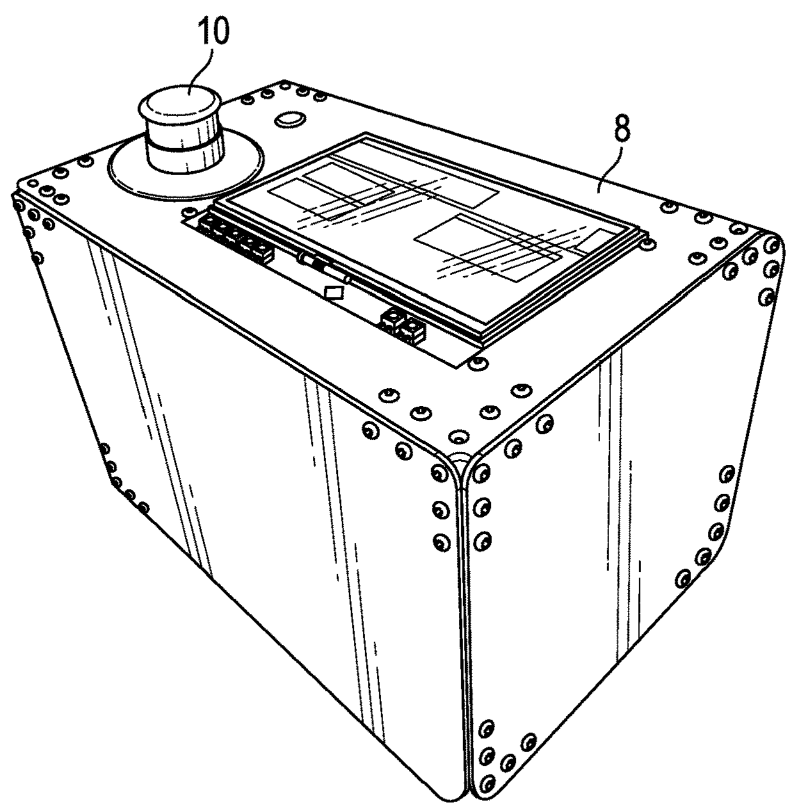
FIG. 7 depicts an image of the Graphical User Interface system which is used in the disclosed device's operation.

The use of this novel device is initiated via a single button on the Graphical User Interface 8. This interface also serves to notify the user of the progress of the process. The Graphical User Interface (GUI) 8 designed for use in this system has at least two screens, which is shown in FIGS. 3(*a*) and 3(*b*). The first screen, labeled Main on the GUI and show in FIG. 3(*a*), controls the main evacuation process and contains two buttons: one to start the process and one to stop it. Once the start button is pressed, the status of the process is updated at each step and displayed the user in the Status box on the GUI. At any time during the process, the user can cancel the evacuation. If the user does so, then a dialogue box is presented that gives the option of returning to the top, default location or remaining in the current configuration. In the event of an emergency or unexpected dysfunction of the GUI, the user can shut off the system by pushing the emergency shut-off button 10. The emergency-shutoff button is connected to and programmed with the GUI using known programming techniques.

The second screen, labeled Settings in the GUI, allows the user to specify the number and type of tubes being evacuated, reset the local running count of tubes squeezed, and displays the lifetime running tube count. This screen will also allow the user to control the up and down motion of the roller mechanism. The settings in this screen can also be used to communicate the status and record of the number of tubes evacuated into a database. The settings interface also displays the current tube count and has a button to reset this counter. This counter is beneficial to enable the user to better track the number of tube that were used to fill a particular container and monitor the average per tube yield. The tube counter also is an indicator of the "Lifetime Tube Count" of the machine; that is, the total amount of tubes that the device emptied over its lifetime or the lifetime of the current service contract. This number would not be user-resettable from the GUI. Finally, the settings screen also has a box to enable manual control of the vertical motion of the device, labeled "Manual Control." The buttons inside this box, labeled "Roll Up" and "Roll Down" move the roller of the device up and down. Limits are still enforced during these operations.

In an additional embodiment, a third screen is included as part of the GUI, labeled "About", is an informational screen that displays information about the device and where to go for additional help. The About screen also provides a button to exit the GUI.

In one embodiment, the developed GUI is based on a web-framework and written in Python. As such, if the control computer is connected to a network, the GUI can also be accessed via the control computer's IP address. The GUI could be accessed via the control computer's IP address. The GUI could be accessed via a smartphone, tablet, a laptop, or PC, or even a larger dedicated touch-screen device. The GUI is adaptive and remains usable across various screen sizes. Those having ordinary skill in the art will recognize various known methods that can be used in order to operate the GUI as described.

In an additional embodiment, in place of the cap-pushers, an additional roller 9 is included. During operation, the tubes being emptied are squeezed between the two rollers 1 and 9.

While the disclosed apparatus was designed for use in compounding pharmaceuticals, the features and advantages of this design described in this application can be utilized by a number of different industries. For instance, the disclosed apparatus could be used in veterinary practice to create custom medications for animals.

The described features, advantages, and characteristics may be combined in any suitable manner in one or more embodiments. One skilled in the relevant art will recognize that the various components of this design may be practiced without one or more of the specific features or advantages of a particular embodiment. In other instances, additional features and advantages may be recognized in certain embodiments that may not be present in all embodiments.

The invention claimed is:

1. An apparatus designed for use in emptying tubes comprising:

(a) at least one holder, wherein said holder includes a hole through which the tube's contents can easily pass;

(b) a flat back-piece;

(c) at least one roller;

(d) at least one pusher system actuator; and wherein the movement of said roller are performed by said push system actuator;

wherein the apparatus is designed to be positioned over a large receptacle;

wherein the use of the apparatus is controlled by a Graphical User Interface comprising at least two screens and an emergency-shutoff button inside a web-based framework and;

wherein the position of the roller is monitored using at least one proximity sensor;

wherein the Graphical User Interface comprises functionality to provide one or more status updates.

2. The apparatus of claim 1, wherein the Graphical User Interface is accessible using a variety of touchscreen devices.

3. The apparatus of claim 1, wherein said push system actuator is powered using a motor.

4. The apparatus of claim 1 further comprising a pusher bar and at least one cap pusher.

5. A method for evacuating contents of pharmaceutical tubes comprising:

(a) providing a device comprising:

i. at least one holder, wherein said holder includes a hole through which the tube's contents can easily pass;

ii. a flat back-piece;

iii. at least one roller;

iv. at least one pusher system actuator;

v. a pusher bar comprising at least one cap-pusher; and vi. a Graphical User Interface comprising a web-based framework, at least two screens, and an emergency-shutoff button;

(b) pressing start on the Graphical User Interface;

(c) moving the roller to at top limit of the device;

(d) move the roller to a bottom limit, squeezing the tubes against the flat back-piece, allowing the contents to be deposited in a large receptacle, wherein the roller is moved to the area just above the tubes;

(e) rotating the cap-pusher into a downward position;

(f) moving the pusher bar to the bottom limit;

moving the roller, pusher bar, and cap pusher upwards to the top limit;

(h) rotating the cap-pusher into an upward position; and (i) providing one or more status updates through the Graphical User Interface at each step of the method.

6. The method of claim 5, wherein the information regarding the number of tubes that were pressed during the application of the method is stored in a database.

7. The method of claim 5, wherein any errors registered during the application of the method are stored in a database.

8. The method of claim 5, wherein the pusher system actuator is powered by a motor.

9. A method for evacuating contents of pharmaceutical tubes comprising:

(a) providing a device comprising:

i. at least one holder, wherein said holder includes a hole through which the tube's contents can easily pass;

ii. a flat back-piece;

iii. at least one roller;

iv. at least one pusher system actuator; and v. a Graphical User Interface comprising a web-based framework, at least two screens, and an emergency-shutoff button;

(b) pressing start on the Graphical User Interface;

(c) moving the roller to at top limit of the device;

(d) move the roller to a bottom limit, squeezing the tubes against the flat back-piece, wherein the roller is moved to fully compress the tubes and the contents of the tubes are deposited into a large receptacle;

(e) moving the roller upwards to the top limit And (f) providing one or more status updates through the Graphical User Interface at each step of the method.

10. The method of claim 9, further comprising two rollers, wherein the tubes are compressed between the two rollers.

11. The method of claim 9, wherein the pusher system actuator is powered by a motor.

* * * * *